Figure 1:
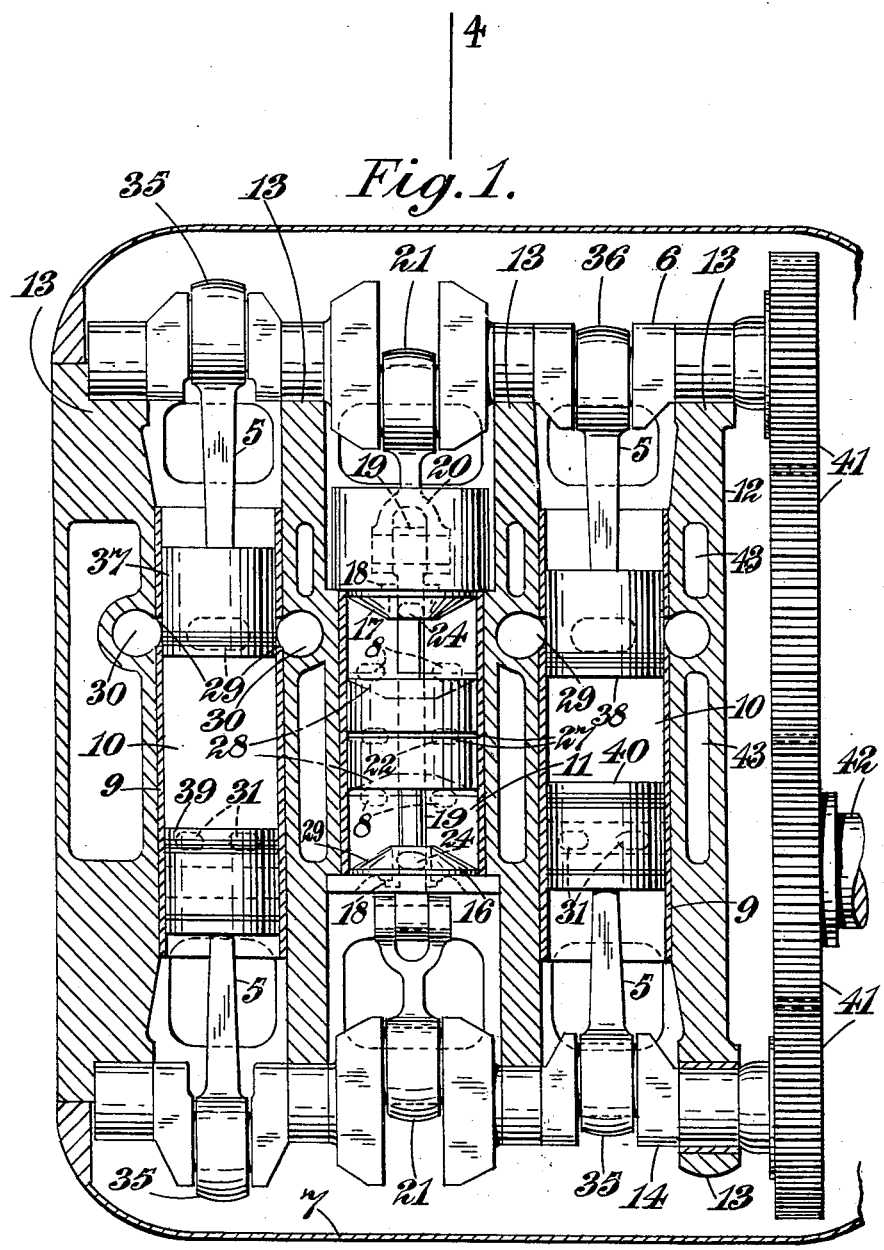

April 25, 1944.  P. C. VINCENT  2,347,444
COMPRESSOR FOR INTERNAL COMBUSTION ENGINES
Filed Feb. 22, 1943  3 Sheets-Sheet 1

Inventor;
P. C. Vincent
By
Young, Emery & Thompson
Attorneys

April 25, 1944.   P. C. VINCENT   2,347,444
COMPRESSOR FOR INTERNAL COMBUSTION ENGINES
Filed Feb. 22, 1943   3 Sheets-Sheet 2

Inventor;
P. C. Vincent
By
Young, Emery & Thompson
Attorneys

April 25, 1944.  P. C. VINCENT  2,347,444
COMPRESSOR FOR INTERNAL COMBUSTION ENGINES
Filed Feb. 22, 1943  3 Sheets-Sheet 3

Inventor,
P. C. Vincent

By Young, Emery & Thompson
Attorneys

Patented Apr. 25, 1944

2,347,444

UNITED STATES PATENT OFFICE 2,347,444

COMPRESSOR FOR INTERNAL COMBUSTION ENGINES

Philip Conrad Vincent, Stevenage, England, assignor to Vincent "H. R. D." Company Limited, Stevenage, England, a British company Application February 22, 1943, Serial No. 476,754
In Great Britain January 6, 1942

9 Claims. (Cl. 123—51)

This invention relates to compressors for internal-combustion engines, particularly of the kind wherein the charge is introduced into the engine cylinders by a pump which in the case of a two-stroke engine, also effects positive scavenging of the burnt gases rather than relying on the inertia of the gases and the inflow of compressed inlet gases from the crank-case for this purpose. By "charge" is meant either a combustible charge or a charge of air which is subsequently to be mixed with fuel.

According to this invention, a compressor for an internal-combustion engine having certain of its cylinders operating on cycles out of phase by 180° or thereabouts, or multiples thereof, is characterised in that the compressor comprises a double-acting reciprocating pump driven in the required phase relationship with the engine and having outlet ports on opposite sides of a pump piston connected respectively to the inlets of the cylinders operating on the out-of-phase cycles. It will be appreciated with this arrangement that in a double-acting pump two pressure impulses are provided in each cycle displaced apart by 180°. Thus, assuming the pump is driven in the required phase relationship with respect to the engine, the engine cylinders will receive their charge at the appropriate times.

The double-acting pump is of the opposed-piston type, having an outlet port, or ports, at the centre of the pump cylinder connected to one engine cylinder or set of cylinders and having outlet ports at both ends of the pump cylinder connected to the other engine cylinder, or set of cylinders.

The inlet port, or ports, of the pump may be arranged to be covered and uncovered by the pistons and for this purpose, may be disposed between the two sets of exhaust ports. With this arrangement, the pistons are so dimensioned that at their inner dead centres their outer edges uncover the inlet ports, whereas at the outer dead centres their inner edges uncover the inlet ports, the outlet ports remaining uncovered during the whole cycle and the flow of gases therethrough being governed by the inlet valve of the engine.

The above form of compressor is particularly suitable for combination with a two-stroke two-cylinder opposed piston engine having its exhaust ports and inlet ports so disposed at opposite ends of each cylinder as to be controlled respectively by the two engine pistons in the required sequence, the inlet port, or ports, in one engine cylinder being connected to one of the outlet ports or set of ports in the pump cylinder and the inlet port, or ports, of the other engine cylinder being connected to the other outlet port or set of ports of the pump cylinder.

The ends of the cylinders are open to the engine crank-case and one of the opposed pistons in each engine cylinder may be arranged partly to uncover an inlet port at the inner dead centre as well as fully uncovering it at the outer dead centre, whereby when the inlet port is partly uncovered it is subjected to the suction which is then taking place in the pump cylinder. This arrangement prevents undue pressure being built up in the crank-case and also results in a part of the oil-laden atmosphere of the crank-case being sucked into the pump cylinder and then transferred to the engine cylinders, helping to ensure adequate lubrication.

In one constructional form of the invention the pump cylinder is arranged between the two engine cylinders and two crankshafts are provided respectively at opposite ends of the set of cylinders, which crankshafts are gear-connected to a driving shaft.

The following is a description of the invention as applied to a two-cylinder two-stroke opposed piston motor cycle engine.

Reference being made to the accompanying drawings in which—

Figure 2:
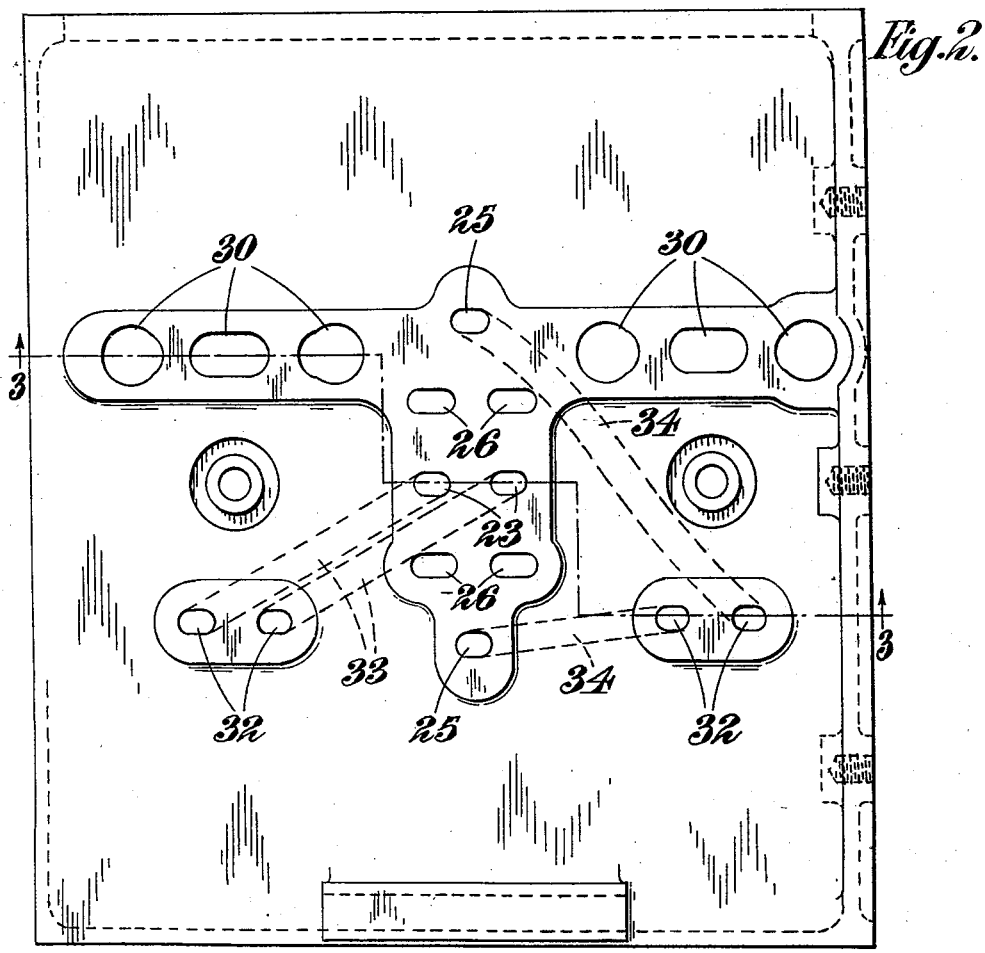
Figure 3:
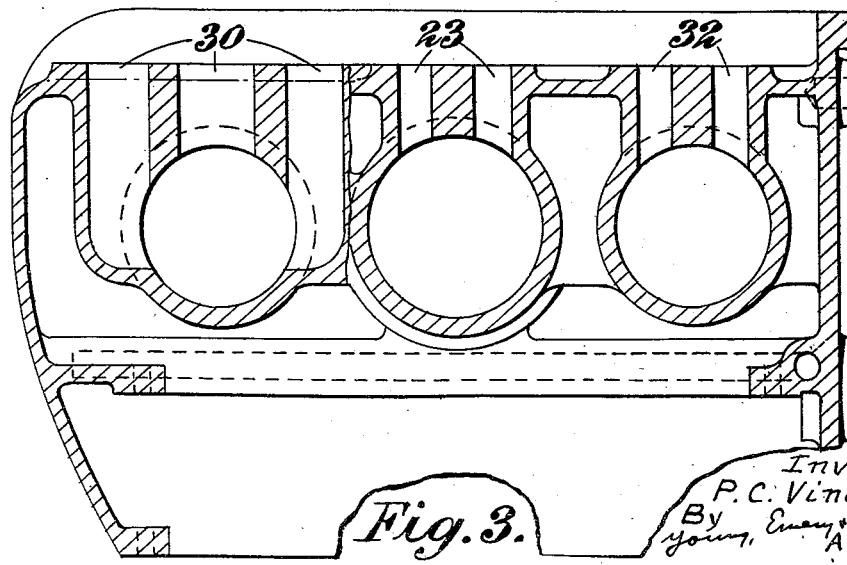
Figure 4:
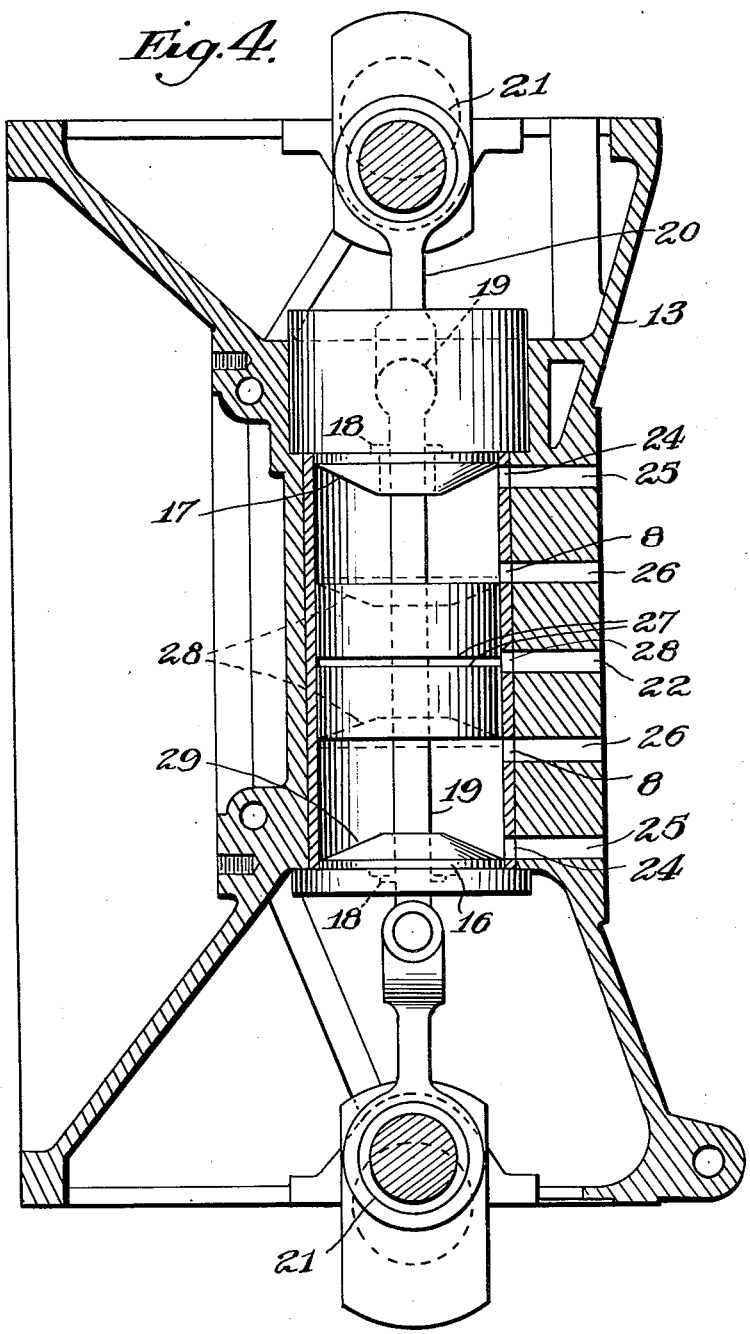

Figure 1 is a section through the engine along a plane containing the axes of the cylinders, Figure 2 is a plan view of the engine, Figure 3 is a cross-section on the cranked line 3—3 on Figure 2, and Figure 4 is a section through the pump cylinder on the line 4—4 of Figure 1.

The engine is arranged so that its cylinders 10 extend horizontally across the fore and aft axis of the motorcycle. Preferably the cylinders comprise liners 9 fixed into the main engine casting 12. A compressor pump cylinder 11 is arranged between the two cylinders with its axis in the same plane as the axes of the engine cylinders. The engine casting 12 is so shaped at each end of the set of cylinders as to provide half-bearing holders 13 for respectively accommodating two crankshafts 8 and 14. The other half-bearing holders are formed in crank-case covers 7 which covers are bolted to the main engine casting. An oil sump 15 is provided beneath the engine casting and is enclosed at each end by the aforesaid crank-cases and at the bottom by a cover plate not shown. The ends of the pump cylinder are closed by plates 16 and 17 and are provided with suitable bearings 18 through which piston-rods 19 extend and are connected at their outer ends to connecting-rods 20 each of which engages one crank-pin 21 of the crankshaft. The pump cylinder is provided midway along its length with two outlet ports 22 circumferentially spaced apart, each extending over about 30° of the circumference and communicating with passages 23 which extend upwardly through an upper wall of the engine casting as seen in Figure 2. The pump cylinder is also provided with a further outlet port 24 near each end of the cylinder and each of the same cross-sectional area as one of the centrally disposed outlet ports. Each of these outlet ports also communicates with a passage 25 extending upwardly through an upper wall of the engine casting. A pair of inlet ports 8 is arranged on each side of the centrally disposed outlet ports 22 between them and the outer outlet ports 24 and again in this instance, inlet passages 26 extend upwardly out through an upper wall of the engine casting. Each of the piston rods 19 has a hollow piston secured to its inner end and in order to obtain a light and strong structure each piston is made hollow and has a flat inner face 27 connected by an internal boss to a conical outer face to which boss the piston rod is attached. The faces of the plates 16 at the ends of the pump cylinder are shaped to correspond. As explained earlier in this specification, each of the pump pistons is arranged to uncover its pair of inlet ports 8 towards the end of both the inward and outward strokes. Each engine cylinder and liner 9 is provided near one end thereof with three exhaust ports 29 disposed circumferentially apart and each subtending an angle of about 60°, which exhaust ports communicate with exhaust passages 30 extending upwardly through the cylinder block. Near the other end of each cylinder are provided two inlet ports 31 which are disposed circumferentially apart and subtend an angle of about 30°. These also communicate with upwardly extending passages 32 in the engine casting. The two centrally disposed outlet passages 23 of the pump cylinder are connected by suitable external conduits indicated by dotted lines 33 with the inlet ports 32 at the end of one cylinder, while the two outermost outlet passages 25 of the pump cylinder are connected to the two inlet ports 32 of the other engine cylinder by external conduits 34. The two pairs of inlet passages 26 of the pump cylinder are connected by suitable external conduits, not shown, with a carburettor. It will be noted that the engine pistons 37 and 38 which are driven by the crankshaft 6 through their connecting rods 5 control the exhaust ports 29 while the engine pistons 39 and 40 driven from the crankshaft 14 through their connecting rod 5 control the inlet ports 31. In order to obtain most favourable timing the crankshaft 6 is given a slight angular lead over the crankshaft 14. The pump pistons however require to work at 180° phase difference and the angular positions of the crank pins will require to be appropriately selected in relation to the other crank pins in order that the inner and outer dead centres occur at the optimum time in relation to the opening and closing of the inlet and exhaust ports of the engine cylinders. The two crankshafts are geared together through a suitable train of gears 41 and drive a shaft 42 which carries one of the gears. The bore of the pump cylinder is greater than that of the cylinders and the throw of its crank-pin is considerably smaller. Suitable water-jacket spaces 43 are provided around the various cylinders.

The forward and rearward parts of the engine casting are provided with transversely extending passages (not shown) parallel with the axes of the engine cylinders for accommodating a torsion-rod to which is secured an arm for carrying the front and rear wheels of the motorcycle, as set out in the specification of British application No. 217/42. As indicated above, the inlet ports 31 in the engine cylinders are so disposed in relation to the stroke of one of the opposed pistons that when the opposed pistons are at their inner dead centres the ports are partly uncovered and since at this time a suction stroke is taking place on the outer side of the pump piston, the pressure in the crank-case will be relieved by a flow of oil-laden atmosphere from the crank-case to the pump cylinder.

I claim:

1. The combination with an internal-combustion engine having cylinders operating on opposed piston cycles, of a charge-feeding compressor comprising a double-acting pump having a cylinder with two opposing pistons reciprocable therein said cylinder having outlet ports on the outer sides of both pistons and an outlet port between the pistons and served by both of them, which ports are connected respectively to the inlet ports of the cylinders operating on the opposed phase cycles, and means for driving the pump in required phase relationship with the engine.

2. The combination with an internal-combustion engine having cylinders operating on opposed piston cycles, of a charge-feeding compressor comprising a double-acting opposed-piston pump and having an outlet port at the centre of the pump cylinder served by both pistons and other outlet ports at opposite ends of the cylinder, which centre and outermost exhaust ports are connected respectively to the inlet ports of the opposed piston cylinders, and means for driving the pump in required phase relationship with the engine.

3. The combination with an internal-combustion engine having cylinders operating on opposed piston cycles, of a charge-feeding compressor comprising a double-acting opposed-piston pump and having an outlet port at the centre of the pump cylinder served by both pistons and other outlet ports at opposite ends of the cylinder, which sets of ports are connected respectively to the inlet ports of the opposed piston cylinders, which pump cylinder is also provided with inlet ports disposed between the two sets of exhaust ports in a position to be covered and uncovered by the pump pistons, and means for driving the pump in required phase relationship with the engine.

4. The combination with an internal-combustion engine having cylinders operating on opposed piston cycles, of a charge-feeding compressor comprising a double-acting opposed-piston pump and having an outlet port at the centre of the pump cylinder and other outlet ports at opposite ends of the cylinder, which centre and outermost exhaust ports are connected respectively to the inlet ports of the opposed cylinders, means controlling said inlet ports, which pump cylinder is also provided with inlet ports disposed between the two sets of exhaust ports in a position to be covered and uncovered by the pump pistons, means for driving the pump in the required phase relationship with the engine, which pump pistons are so dimensioned and their stroke so selected that at their inner dead centres their outer edges uncover the inlet ports, whereas at their outer dead centres their inner edges uncover the inlet ports, while the outlet ports remain uncovered during the whole cycle.

5. The combination with a two-stroke two-cylinder opposed-piston internal combustion engine having exhaust ports and inlet ports disposed at opposite ends of each cylinder and operating on cycles out-of-phase by 180°, of a charge-feeding compressor comprising a double-acting pump of the opposed-piston type having an outlet port at the centre of the pump cylinder and other outlet ports at opposite ends of the cylinder, which two sets of ports are connected respectively with the inlet ports of the two engine cylinders and which pump cylinder is provided with inlet ports controlled by the pump piston, and means for driving the pump in required phase relationship with the engine.

6. The combination with a two-stroke opposed-piston engine having exhaust ports and inlet ports disposed at opposite ends of each cylinder and controlled respectively by the engine pistons of a charge-feeding compressor comprising an opposed-piston double-acting pump having an outlet port at the ventre of the pump cylinder and served by both compressor pistons and other outlet ports at opposite ends of the cylinder, which two sets of outlet ports are connected respectively with inlet ports of the engine cylinders, a crankcase into which the ends of the engine cylinders open, one of the opposed pistons in each engine cylinder being arranged partly to uncover its inlet port at the inner dead centre as well as fully uncovering it at the outer dead centre and means for driving the pump in required phase relationship with the engine and so that suction is taking place in the pump cylinder while the inlet ports in the engine cylinders are partly uncovered at inner dead center, whereby oil-laden atmosphere flows from the crank-case into the pump cylinder, thereby reducing the crank-case pressure and lubricating the pump.

7. The combination with a two-cylinder opposed-piston engine having exhaust ports and inlet ports at opposite ends of each cylinder controlled respectively by the two engine pistons, a pump cylinder arranged between the two engine cylinders and having opposed pistons therein, two crankshafts arranged at opposite ends of the set of cylinders, which crankshafts are connected to a driving shaft, outlet ports in the pump cylinder at the centre thereof and at opposite ends thereof, inlet ports between the central exhaust port and each of the other ports, which centrally-disposed exhaust port is connected to the inlet ports of one engine cylinder, and which outwardly disposed ports are connected to the inlet ports of the other engine cylinder, and means for driving the pump in required phase relationship with the engine.

8. The combination with an internal combustion engine having cylinders operating on opposed-piston cycles, of a charge-feeding compressor comprising a double-acting opposed-piston pump having an outlet port at the center of the pump cylinder served by both pistons, and other outlet ports at opposite ends of the cylinders, which center and outermost exhaust ports are connected respectively to the inlet ports for the opposed phase cylinders, and means for driving the pump in the required phase-relationship with the engine, so that the compression between the pump pistons is greatest when one set of engine pistons is near the outer dead center, and so that the compression between the pump pistons and the outer ends of the pump cylinder is greatest when the other set of engine pistons is near the outer dead center.

9. The combination with an internal combustion engine having cylinders operating on opposed-piston cycles, of a charge-feeding compressor comprising a double-acting opposed-piston pump having an outlet port at the center of the pump cylinder served by both pistons, and other outlet ports at opposite ends of the cylinders, which sets of outlet ports are connected respectively to the inlet ports of the opposed phase cylinders, which pump cylinder is also provided with inlet ports disposed between the two sets of exhaust ports in a position to be be covered and uncovered by the pump piston, and means for driving the pump in the required phase-relationship with the engine so that the inlet ports are uncovered by the pump piston near the inner dead center and when one set of engine pistons is near the outer dead center, and are also uncovered when the pump pistons are at the outer dead center and when the other set of engine pistons are near the outer dead center, and so that the compression between the pump pistons is greatest when one set of engine pistons are near the outer dead center, and so that the compression between the pump pistons and the outer ends of the pump cylinder is greatest when the other set of engine pistons is near the outer dead center.

PHILIP CONRAD VINCENT.